United States Patent [19]

Wang et al.

[11] Patent Number: 5,756,561
[45] Date of Patent: May 26, 1998

[54] ERASABLE INK COMPOSITION CONTAINING A GRAFT-POLYMERIZED DYE

[75] Inventors: Aiying Wang, Simpsonville; Jeffery H. Banning, Spartanburg; Wayne A. Chandler, Mauldin; David C. Villiger, Greenville; Barry W. Chadwick, Simpsonville, all of S.C.

[73] Assignee: BIC Corporation, Milford, Conn.

[21] Appl. No.: 659,089

[22] Filed: Jun. 4, 1996

Related U.S. Application Data

[63] Continuation of Ser. No. 361,109, Dec. 21, 1994, abandoned.

[51] Int. Cl.$^6$ .................................................. C09D 11/18
[52] U.S. Cl. ..................... 523/161; 524/504; 524/458; 524/460; 401/209; 106/31.23; 106/31.27; 106/31.28; 523/200; 260/DIG. 38
[58] Field of Search ...................... 523/161, 200; 106/21 A, 22 R, 23 R, 23 B, 31.23, 31.27, 31.28; 524/504, 458, 460; 401/209; 260/DIG. 38

[56] References Cited

U.S. PATENT DOCUMENTS

| | | | |
|---|---|---|---|
| 3,875,105 | 4/1975 | Daugherty et al. | 523/161 |
| 3,949,132 | 4/1976 | Seregely et al. | 428/207 |
| 4,059,554 | 11/1977 | Pacansky | 524/486 |
| 4,097,290 | 6/1978 | Muller et al. | 106/30 R |
| 4,137,083 | 1/1979 | Hedrick | 106/20 R |
| 4,212,676 | 7/1980 | Ueda | 106/19 B |
| 4,227,930 | 10/1980 | Lin | 106/19 A |
| 4,256,494 | 3/1981 | Yamamoto et al. | 106/22 A |
| 4,329,262 | 5/1982 | Muller | 523/161 |
| 4,329,264 | 5/1982 | Muller | 523/161 |
| 4,349,639 | 9/1982 | Muller | 523/161 |
| 5,217,255 | 6/1993 | Lin et al. | 281/15.1 |
| 5,362,167 | 11/1994 | Loftin | 401/198 |
| 5,389,717 | 2/1995 | Santini et al. | 524/575 |

FOREIGN PATENT DOCUMENTS

| | | |
|---|---|---|
| 0054832 | 6/1982 | European Pat. Off. |
| 1-289881 | 11/1989 | Japan |
| 8301625 | 5/1983 | WIPO |
| 9312175 | 6/1993 | WIPO |
| 9324565 | 12/1993 | WIPO |

*Primary Examiner*—Vasu Jagannathan
*Assistant Examiner*—John J. Guarriello
*Attorney, Agent, or Firm*—Pennie & Edmonds LLP

[57] ABSTRACT

An erasable ink composition contains a water-insoluble polymeric dye obtained by the graft polymerization of a preformed water-insoluble polymer with a dye monomer possessing at least one ethylenically unsaturated site. The ink is intended for use in any of a variety of marking instruments, in particular, a ball-point pen.

16 Claims, No Drawings

ERASABLE INK COMPOSITION CONTAINING A GRAFT-POLYMERIZED DYE

This is a continuation of application Ser. No. 08/361,109 filed on Dec. 21, 1994 now abandoned.

BACKGROUND OF THE INVENTION

This invention relates to an erasable ink composition and to a marking instrument, e.g., a ball-point pen, containing the composition. More particularly, this invention relates to an erasable ink composition containing a water-insoluble polymer dye component, i.e., a polymer possessing a dye moiety covalently bonded thereto.

Numerous erasable ink compositions are known, e.g., those described in U.S. Pat. Nos. 3,834,823, 3,875,105, 3,949,132, 4,097,290, 4,212,676, 4,227,930, 4,256,494, 4,297,260, 4,329,262, 4,329,264, 4,349,639, 4,357,431, 4,367,966, 4,368,076, 4,379,867, 4,389,499, 4,390,646, 4,391,927, 4,407,985, 4,410,643, 4,419,464, 4,441,928, 4,509,982, 4,525,216, 4,557,618, 4,578,117, 4,596,846, 4,606,769, 4,629,748, 4,687,791, 4,721,739, 4,738,725, 4,760,104, 4,786,198, 4,830,670, 4,954,174, 4,960,464, 5,004,763, 5,024,898, 5,037,702, 5,082,495, 5,114,479, 5,120,359, 5,160,369 and 5,217,255. These inks are formulated by mixing a dye (taken herein to also include "pigment", "colorant", "chromophore" and other terms of similar meaning) with a variety of polymer and liquid carrier/solvent combinations thereby forming a flowable dye/polymer matrix. The polymer component is chosen for its film forming properties and its ability to be readily removed from the substrate to which it is applied, e.g., cellulosic paper, through the abrasive action of an eraser. However, a common problem with these erasable ink compositions concerns the residual dye which remains after erasure. Incomplete erasure may be attributed to inadequate removal of the dye/polymer matrix from the paper substrate and/or migration of dye into the pores of the substrate.

SUMMARY OF THE INVENTION

In accordance with the present invention an erasable ink composition is provided which comprises:

a) a water-insoluble polymer dye obtained by the graft polymerization of a preformed water-insoluble polymer with an ethylenically unsaturated dye monomer; and, b) an evaporable liquid carrier for the polymer dye.

Since the dye is covalently bonded to the polymer in the polymer dye component of the foregoing erasable ink composition, there is little opportunity for it to separate from the polymer and migrate into a porous substrate. Thus, the erasable ink composition of this invention is apt to leave significantly less residual dye following its erasure than known erasable ink compositions in which the dye is merely physically combined with the polymer component(s).

DESCRIPTION OF THE PREFERRED EMBODIMENTS

The polymer dye component of the erasable ink composition of this invention is prepared by the graft polymerization of a preformed water-insoluble polymer with a dye monomer possessing at least one ethylenically unsaturated site. A variety of graft polymerization methods are known and are contemplated herein for obtaining the polymer dye component. Reference may be made to the discussion of graft copolymers in Mark et al., eds, "Encyclopedia of Polymer Science and Engineering," Vol. 7, pp. 551–579, John Wiley & Sons, Inc. (1987), the contents of which are incorporated by reference herein.

The preformed water-insoluble polymer which is graft polymerized with the dye monomer can be any synthetic, semisynthetic or natural polymer which is capable of forming free radicals with the liberation of hydrogen under the influence of a polymerization initiator or in which active sites can be generated by energy-rich radiation. Suitable polymers include those derived from one or more olefinically unsaturated monomers, for example polymers and copolymers of ethylene, propylene, butadiene, isobutylene, isoprene, vinyl chloride, vinyl esters, vinyl ethers, acrolein, acrylic esters, methacrylic esters, acrylamides, methacrylamides, acrylonitrile and methacrylonitrile; those derived from one or more cyclic compounds such as lactones and lactams and cyclic ethers, sulfides and amines such as polycaprolactones, polycaprolactams, polyethyleneimines and poly(3,3-bis-chloromethyl)-oxetane; polycondensates such as phenol resins, urea resins, melamine resins and alkyd resins; polyesters such as those derived from terephthalic acid and ethylene glycol; polycarbonates; polyamides such as those derived from adipic acid and hexamethylenediamine; unsaturated polyesters; polyaddition resins such as polyurethanes and epoxy resins; and, natural and semisynthetic polymers such as cellulose, chemically modified cellulose and natural rubbers.

Among the dye monomers that can be graft polymerized onto the preformed water-insoluble polymer are those of the general formula

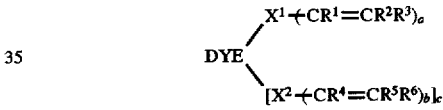

wherein DYE represents a dye residue, $X^1$ and $X^2$ each represents a bridging group covalently linking the dye residue to the ethylenically unsaturated group(s), $R^1$, $R^2$, $R^3$, $R^4$, $R^5$ and $R^6$ each is hydrogen or halogen or an aliphatic or aromatic group of up to about 12 carbon atoms unsubstituted or substituted with one or more halogen atoms and/or one or more hydroxyl, sulfhydryl, carboxylic acid, amino, nitro, alkoxy, alkoxycarbonyl or cyano groups, a is 1 to 5, b is 1 to 5 and c is 0 or 1.

Dye residue DYE can, for example, be derived from a yellow dye such as 1-phenylthio-5-(3'-methacryloylamidothiophenyl)-anthraquinone, 1-(3'-methacryloylamidophenylthio)-anthraquinone or 1-(4'-tertbutylphenylthio)-5-(3'-methacryloylamidophenylthio)-anthraquinone; a blue dye such as 4-amino-1,8-dihydroxy-2,7-diisobutyl-5-methacryloyl-amidoanthraquinone or 4-amino-1,8-dihydroxy-2,7-diisopropyl-5-methacryloylamidoanthraquinone, 4-amino-1,5-dihydroxy-2,6-diisobutyl-8-methacryloylamidoanthraquinone a cyan dye such as N-(3'-methacryloylamidopropyl) 1,4-diaminoanthraquinone-2,3-dicarboximide, N-(6'-methacryloylamidohexyl) 1,4-diaminoanthraquinone-2,3-dicarboximide or N-(6'-methacryloylhexyl) 1,4-diaminoanthraquinone-2,3-dicarboximide; a purple dye such as N-(3'-methacryloylpropyl) 1-amino-4-methacryloylamidoanthraquinone-2,3-dicarboximide; a magenta dye such as 1-amino-4-hydroxy-2-(N-3'-methacryloylpropylamino)-anthraquinone, 1-amino-4-hydroxy-2-(N-3'-methacryloylhexylamino)-anthraquinone, 1-amino-4-hydroxy-2-(N-3'-methacryloylamido-hexylamino)-anthraquinone or 1-amino-4-hydroxy-2-(3'-methacryloylhexylthio)-anthraquinone; or a red dye such as 1,5-dihydroxy-2,6-diisobutyl-4-(3'-methacryloylamidophenylthio)-anthraquinone, 1,8-dihydroxy-2,7-diisobutyl-4-(3'-methacryloylamidophenylthio)-anthraquinone, 1,5-dihydroxy-2,6-diisobutyl-4-methacryloylamidoanthraquinone, 1,8-dihydroxy-2-7-diisobutyl-4-methacryloylamidoanthraquinone, 1,8-dihydroxy-2,7-diisopropyl-4-methacryloylamidoanthraquinone or 1,4,5-triphenylthio-8-(3'-methacryloylamido-phenylthio)-anthraquinone.

Preferred bridging groups $X^1$ and $X^2$ include the groups —NHCO—, —OCNH—, —((OC)$_2$N—, —NHR$^7$OOC— and —N(R$^7$OOC)$_2$ in which R$^7$ is an aliphatic group of up to about 12 carbon atoms, and —X$^3$R$^8$(OOC)$_d$ in which X$^3$ is —O—, —COO— or —NH—, R$^8$ is an aliphatic group of up to about 12 carbon atoms, optionally containing at least one ester linkage, and d is equal to a in the case of bridging group $X^1$ and to c in the case of bridging group $X^2$. Specific $X^1$ and $X^2$ bridging groups include —NHCH$_2$CH$_2$OOC—, —N(CH$_2$CH$_2$OOC)$_2$, —COOC(C$_2$H$_5$)(CH$_2$OOC)$_2$, —OCH$_2$COOC(C$_2$H$_5$)(CH$_2$OOC)$_2$ and

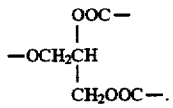

Preferred dye monomers are those in which R$^1$ and R$^2$ each is hydrogen, halogen, lower alkyl, alkoxycarbonyl or cyano, and more preferably hydrogen or methyl, and R$^2$, R$^3$, R$^5$ and R$^6$ each is hydrogen. Specific dye monomers include the following:

1,4-bis-(2-acryloyloxyethylamino)anthraquinone 1,4-bis-(2-acryloyloxy-1-ethylethylamino)anthraquinone 1,4-bis-[4-(2-acryloyloxyethoxy)phenylamino]anthraquinone 1,4-bis-(2-acryloyloxyethylamino)-5-hydroxy-8-nitro-anthraquinone 1,5-bis-(2-acryloyloxyethylamino)anthraquinone 2-(4-acryloyloxyphenyl)-4-acryloylamino-1-aminoanthraquinone 1,4-bis-(4-acryloyloxymethyl-2,6-methylanilino)anthraquinone 1-[2-(1,1-acryloyloxymethyl)propoxycarbonylethylamino]-4-amino-8-hydroxy-5-nitroanthraquinone 1,8-bis-(2-acryloyloxyethylamino)-4,6-dihydroxyanthraquinone 1,4-bis-(2-acryloyloxyethylamino)-5,8-dihydroxyanthraquinone 1,5-bis-(2-acryloyloxyethylamino)-4,8-dihydroxyanthraquinone 1,8-bis-(2-acryloyloxyethylamino)anthraquinone 4-acryloylamino-2-(2-acryloyloxyethoxy)-1-aminoanthraquinone 1,5-bis-(2-acryloyloxyethylamino)naphtha-4,8-diquinone 1,5-bis-(2-acryloyloxyethylamino)dibromonaphtha-4,8-diquinone 2-[4-N:N-bis-(2-acryloyloxyethylamino)phenyl]-6-methoxy-3-methylbenzthiazoluine methosulphate 3-[4-N:N-bis-(2-acryloyloxyethylamino)phenylazo]-2,4-dimethylthiazolium methosulphate Copper phthalocyanine-(SO$_3$H)$_2$(SO$_2$NCH$_2$CH$_2$OCOCH=CH$_2$)$_2$ Copper phthalocyanine-(CH$_2$OCOCH=CH$_2$)$_3$ 4-(2,2-bis-acryloyloxymethylethoxy)-N-(2,4-dinitrophenyl)aniline 1-[4-N:N-bis-(2-acryloyloxyethyl)aminophenyl]-2,2-dicyanoethylene 3-[N:N-bis(2-acryloyloxyethyl)carbamoyl]-1-(2-chloro-s-trifluoromethyl)phenylazo-2-hydroxynaphthalene N:N-bis-(2-acryloyloxyethyl)-3-acetylamino-4-(2-chloro-4-methylsulphonyl)phenylazoaniline 2-[4-N:N-bis-(2-acryloyloxyethyl)amino]-2-methylphenylazo-6-nitrobenzthiazole 3-[N:N-bis-(2-acryloyloxyethyl)carbamyl]-1-(2-nitro)phenylazo-2-hydroxynaphthalene 5-[4-N:N-bis-(2-acryloyloxyethyl)aminophenylazo]-3-2-[(1,1-bis-acryloyloxymethyl)propoxycarbonyl]-ethylthio-1,2,4-thiadiazole N,N-bis-(2-acryloyloxyethyl)-4-(2,6-dichloro-4-nitro)phenylazoaniline 2,9-bis-(2-acryloxyethylamino)-6,13-dichlorotriphendioxazine These and other useful dye monomers are described in U.S. Pat. No. 4,763,371 the contents of which are incorporated by reference herein. Still other useful dye monomers are described in U.S. Pat. Nos. 4,795,794 and 5,188,641, the contents of which are also incorporated by reference herein.

The graft polymerization of the dye monomer onto the preformed polymer can be initiated by known and conventional means such as the use of free radical initiators, energy-rich radiation or a combination of such initiators and radiation. The amount of dye monomer(s) graft polymerized onto the preformed water-insoluble polymer can vary widely depending on the color intensity desired. Thus, for example, from about 0.5 to about 20, and preferably from about 1 to about 10 weight percent of dye monomer(s) by weight of preformed polymer can be employed.

In a preferred process for producing the polymer dye component of the erasable ink of this invention, the preformed water-insoluble polymer is provided as an aqueous emulsion of a water-insoluble vinyl copolymer to which the dye monomer is added. Depending on the specific graft polymerization procedure selected, the preformed water-insoluble polymer can be irradiated and/or free radical initiator(s) can be added to the reaction medium to generate active sites in the polymer serving as points of attachment for the polymerizable monomeric dye. The resulting graft polymerization product will itself be an aqueous emulsion of water-insoluble polymer dye particles suitable for use, with or without the addition of any optional component(s), as the erasable ink composition of this invention.

The polymer dye component of the erasable ink composition of this invention will generally possess an average particle size of from about 25 to about 1000 nanometers and preferably from about 50 to about 250 nanometers. Where the polymer dye component is not obtained in a particle size which is suitable for use in the erasable ink composition herein, it may be reduced to such size by any known or conventional method for obtaining polymer powders, for example, by grinding, milling, or by any of several "hot water" emulsification processes for producing polymer powders such as that described in U.S. Pat. No. 3,586,654, the contents of which are incorporated by reference herein.

The fully formulated erasable ink composition, i.e., the polymer dye component in admixture with the evaporable liquid carrier component and any optional component(s), can possess a relatively low viscosity, e.g., from about 1 to about 80,000 centipoises and preferably from about 3 to about 30,000 centipoises when water is the carrier, or a relatively high viscosity, e.g., at least about 100,000 centipoises and preferably at least about 500,000 centipoises when the carrier is an organic solvent or mixture of organic solvents which swell or dissolve the polymer dye. It will, of course, be recognized that when the erasable ink composition possesses such a high viscosity that it no longer readily flows solely under the influence of gravity, it becomes necessary to provide a pressurized delivery system for any marking instrument containing the ink.

To improve or optimize one or more functional characteristics of the erasable ink composition, one or more optional components can be added in the usual amounts to the composition, e.g., one or more natural and/or synthetic polymer latices, rheological modifiers, suspension agents, humectants, emulsifiers, surfactants, plasticizers, spreading agents, drying agents, release agents, parting agents, preservatives, antimicrobial agents, anticorrosion agents, antioxidants, coalescing aids, and the like.

With or without the addition of any optional component(s), the erasable ink composition when applied to a substrate, and particularly a porous substrate such as a cellulosic paper, and upon drying thereon must be (1) sufficiently adherent to the substrate as to resist flaking therefrom and (2) substantially erasable. Thus, the dry erasable ink composition of this invention can be evaluated by an adherency test wherein a sample of ink is applied to preweighed paper, the paper is again weighed, crumpled by hand and weighed again to determine the amount of ink which flaked off the paper as a result of the crumpling. The erasable ink composition will generally exhibit less than about 30 weight percent flaking, preferably less than about 20 weight percent flaking and even more preferably less than about 10 weight percent flaking. Erasability of the ink can be evaluated by ASTM D-2244-89 in which ink is applied to paper, erased and the erased portion of the paper and an unblemished/untouched portion of the paper are tested for reflectance. A quantitive value is obtained, i.e., delta E*ab from CIE lab measurement. Lower values indicate more complete erasure. The erasable ink composition of this invention will generally possess erasability values delta E*ab of on the order of less than about 4.0, preferably less than about 3.5 and even more preferably less than about 3.0.

The erasable ink composition herein can be subjectively evaluated for smearability by attempting to smudge the ink with one's fingers 1–2 seconds after writing. A smear value of 1 represents essentially no smearing and a smear value of 5 represents such a degree of smearing that legibility of the writing is significantly impaired. The erasable ink composition of this invention will exhibit a subjectively determined low level of smear, e.g., a smear value of 2 or less and preferably a smear value of 1 (i.e., essentially no smearing).

The erasable ink composition of this invention is intended to be used in any of a variety of marking instruments and in particular, a ball-point pen.

The following examples are illustrative of the erasable ink composition of this invention.

EXAMPLE ILLUSTRATING THE PREPARATION OF ETHYLENICALLY UNSATURATED DYE MONOMER

Example 1

Dimethyl Meta-Isopropenyl benzyl isocyanate (Cytec Ind./American Cyanamid Co.) (2.05 g) and the azo condensation product resulting from the reaction of ethylphenylethanolamine and para-nitroaniline (3.19 g) were dissolved in toluene (100 g). To the solution, dibutyltin dilaurate catalyst (0.1 g) was added and the solution was refluxed for 12 hours. The toluene was removed and the resulting red-colored ethylenically unsaturated dye monomer was recrystallized in ethanol.

EXAMPLE ILLUSTRATING THE PREPARATION OF POLYMER DYE VIA GRAFT POLYMERIZATION

Example 2

A natural rubber latex pre-formed polymer (GLN 200 from Goodyear) (100 g) was stirred with ammonium hydroxide (1.1 g) and a 30% solution of hydrogen peroxide (30.0 g) at room temperature for 12 hours. The red-colored ethylenically unsaturated dye monomer of Example 1 (2.5 g) was stirred in a separate container with oleic acid (0.5 g) and methyl methacrylate (10 g). This solution of dye monomer was then added to the pre-formed polymer and the resulting mixture was stirred for about 1 minute. The mixture was allowed to set for 24 hours and thereafter filtered to provide a red erasable ink composition containing approximately 61 weight percent solids. The calculated $T_g$ value for Example 2 was about −80° C.

While this invention has been disclosed herein in connection with certain embodiments and certain procedural details, it is clear that changes, modifications or equivalents can be used by those skilled in the art. Accordingly, such changes within the principles of this invention are intended to be included within the scope of the claims below.

What is claimed is:

1. An erasable ink composition which comprises:
   a) a water-insoluble polymer dye obtained by the graft polymerization of a preformed water-insoluble polymer with an ethylenically unsaturated dye monomer; and,
   b) an evaporable liquid carrier for the polymer, the erasable ink composition when applied to a substrate and upon drying thereon exhibiting less than about 30 weight percent flaking based on the weight of the dried ink and an erasability value delta E*ab of less than about 4.0.

2. The erasable ink composition of claim 1 exhibiting less than about 20 weight percent flaking based on the weight of the dried ink and an erasability value delta E*ab of less than about 3.5.

3. The erasable ink composition of claim 1 exhibiting less than about 10 weight percent flaking based on the weight of the dried ink and an erasability value delta E*ab of less than about 3.0.

4. The erasable ink composition of claim 1 wherein the carrier is an aqueous liquid, the polymer dye being dispersed therein.

5. The erasable ink composition of claim 1 wherein the polymer dye possesses an average particle size of from about 25 to about 1000 nanometers.

6. The erasable ink composition of claim 1 wherein the polymer dye possesses an average particle size of from about 50 to about 250 nanometers.

7. The erasable ink composition of claim 9 wherein the composition possesses a viscosity of at least about 500,000 centipoises.

8. The erasable ink composition of claim 1 wherein the water-insoluble polymer is derived from one or more olefinically unsaturated monomers such as ethylene, propylene, butadiene, isobutylene, isoprene, vinyl chloride, vinyl esters, vinyl ethers, acrolein, acrylic esters, methacrylic esters, acrylamides, methacrylamides, acrylonitrile and methacrylonitrile, one or more cyclic compounds such as lactones, lactams,cyclic ethers, cyclic sulfides, cyclic amines, polycaprolactones, polycaprolactams, polyethyleneimines and poly(3,3-bis-chloromethyl)-oxetane, polycondensates such as phenol resins, urea resins, melamine resins and alkyd resins, polyesters such as those derived from terephthalic acid and ethylene glycol, polycarbonates, polyamides such as those derived from adipic acid and hexamethylenediamine, unsaturated polyesters, polyaddition resins such as polyurethanes and epoxy resins, and natural and semisynthetic polymers such as cellulose, chemically modified cellulose and natural rubbers.

9. The erasable ink composition of claim 1 wherein the preformed water-insoluble polymer is provided as an aqueous emulsion of a water-insoluble vinyl polymer.

10. The erasable ink composition of claim 1 wherein the dye monomer is an ethylenically unsaturated compound of the general formula

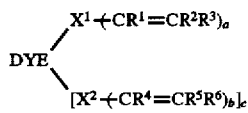

wherein DYE represents a dye residue, $X^1$ and $X^2$ each represents a bridging group covalently linking the dye residue to the ethylenically unsaturated group(s), $R^1$, $R^2$, $R^3$, $R^4$, $R^5$ and $R^6$ each is hydrogen or halogen or an aliphatic or aromatic group of up to about 12 carbon atoms, unsubstituted or substituted with one or more halogen atoms and/or one or more hydroxyl, sulfhydryl, carboxylic acid, amino, nitro, alkoxy, alkoxycarbonyl or cyano groups, a is 1 to 5, b is 1 to 5 and c is 0 or 1.

11. The erasable ink composition of claim 10 wherein DYE is derived from a yellow dye such as 1-phenylthio-5-(3'-methacryloylamidothiophenyl)-anthraquinone, 1-(3'-methacryloylamidophenylthio)-anthraquinone or 1-(4'-tertbutylphenylthio)-5-(3'-methacryloylamidophenylthio)-anthraquinone, a blue dye such as 4-amino-1,8-dihydroxy-2,7-diisobutyl-5-methacryloyl-amidoanthraquinone or 4-amino-1,8-dihydroxy-2,7-diisopropyl-5-methacryloylamidoanthraquinone, 4-amino-1,5-dihydroxy-2,6-diisobutyl-8-methacryloylamidoanthraquinone, a cyan dye such as N-(3'-methacryloylamidopropyl) 1,4-diaminoanthraquinone-2,3-dicarboximide, N-(6'-methacryloylamidohexyl) 1,4-diaminoanthraquinone-2,3-dicarboximide or N-(6'-methacryloylhexyl) 1,4-diaminoanthraquinone-2,3-dicarboximide, a purple dye such as N-(3'-methacryloylpropyl) 1-amino-4-methacryloylamidoanthraquinone-2,3-dicarboximide, a magenta dye such as 1-amino-4-hydroxy-2-(N-3'-methacryloylpropylamino)-anthraquinone, 1-amino-4-hydroxy-2-(N-3'-methacryloylhexylamino)-anthraquinone, 1-amino-4-hydroxy-2-(N-3'-methacryloylamidohexylamino)-anthraquinone or 1-amino-4-hydroxy-2-(3'-methacry-loylhexylthio)-anthraquinone, or a red dye such as 1,5-dihydroxy-2,6-diisobutyl-4-(3'-methacryloylamidophenylthio)-anthraquinone, 1,8-dihydroxy-2,7-diisobutyl-4-(3'-methacryloylamidophenylthio)-anthraquinone, 1,5-dihydroxy-2,6-diisobutyl-4-methacryloylamidoanthraquinone, 1,8-dihydroxy-2-7-diisobutyl-4-methacryloylamidoanthraquinone, 1,8-dihydroxy-2,7-diisopropyl-4-methacryloylamidoanthraquinone or 1,4,5-triphenylthio-8-(3'-methacryloylamido-phenylthio)-anthraquinone.

12. The erasable ink composition of claim 10 wherein the bridging groups $X^1$ and $X^2$ include the groups —NHCO—, —OCNH—, —(OC)$_2$N—, —NHR$^7$OOC— and —N(R$^7$OOC-)$_2$ in which R$^7$ is an aliphatic group of up to about 12 carbon atoms, and —X$^3$R$^8$(OOC-)$_2$ in which X$^3$ is —O—, —COO— or —NH—, R$^8$ is an aliphatic group of up to about 12 carbon atoms, optionally containing at least one ester linkage, and d is equal to a in the case of bridging group $X^1$ and to c in the case of bridging group $X^2$.

13. The erasable ink composition of claim 10 wherein the preformed water-insoluble polymer is provided as an aqueous emulsion of a water-insoluble vinyl polymer.

14. The erasable ink composition of claim 1 further comprising at least one component selected from the group consisting of natural latices, synthetic latices, rheological modifiers, suspension agents, humectants, emulsifiers, surfactants, plasticizers, spreading agents, drying agents, release agents, parting agents, preservative, antimicrobial agents, anticorrosion agents, antioxidants and coalescing aids.

15. A marking instrument containing the erasable ink composition of claim 1.

16. The marking instrument of claim 15 which is a ball-point pen.

* * * * *